United States Patent
Vogelaar et al.

[15] 3,636,684
[45] Jan. 25, 1972

[54] ENGINE ENCLOSURE FOR A HARVESTING MACHINE

[72] Inventors: Bernard Francis Vogelaar; James Peter Doering, both of Moline; Felix Stanley Pasturczak, East Moline, all of Ill.

[73] Assignee: Deere & Company, Moline, Ill.

[22] Filed: Aug. 25, 1969

[21] Appl. No.: 852,689

[52] U.S. Cl. ............................................. 56/14.7, 56/124
[51] Int. Cl. ......................................................... A01d 41/12
[58] Field of Search ....................................... 56/20–24, 124, 56/125, 14.7; 180/69

[56] References Cited

UNITED STATES PATENTS

| | | | |
|---|---|---|---|
| 2,041,522 | 5/1936 | Breer | 180/69 |
| 2,199,036 | 4/1940 | Best | 180/69 |
| 2,468,809 | 5/1949 | Brock et al. | 180/69 |
| 2,999,347 | 9/1961 | Horne et al. | 56/21 |
| 3,073,099 | 1/1963 | Andersen | 56/20 |
| 3,358,787 | 12/1967 | Bangasser et al. | 180/69 |

Primary Examiner—Louis G. Mancene
Assistant Examiner—J. N. Eskovitz
Attorney—H. Vincent Harsha, Harold M. Knoth, William A. Murray and John M. Nolan

[57] ABSTRACT

A self-propelled combine has a mobile main separator body with an elevated grain tank mounted on a central portion of the body and a forward operator's station and engine enclosure mounted side by side at the forward end of the body immediately in front of the grain tank. The engine enclosure has an air outlet in its outer lateral side and air inlets in both the top and front side of the enclosure. A transversely oriented internal combustion engine is mounted in the enclosure and has a radiator opposite the outlet opening. A fan in the outlet opening draws air through the inlet openings and through the radiator, discharging it through the outlet opening at the side of the combine. The air drawn through the radiator is filtered by means of screens in the air inlets, and the top and front of the enclosure are provided with louvers to deflect part of the air along the surface of the screens to carry away foreign material collected thereon, the contaminated air bypassing the radiator and being discharged out the side of the combine with the cooling air.

14 Claims, 9 Drawing Figures

INVENTORS
B. F. VOGELAAR
J. P. DOERING
F. S. PASTURCZAK

INVENTORS
B. F. VOGELAAR
J. P. DOERING
F. S. PASTURCZAK

ENGINE ENCLOSURE FOR A HARVESTING MACHINE

BACKGROUND OF THE INVENTION

This invention relates to self-propelled agricultural machines, such as a combine or the like, and more particularly to an engine enclosure and its arrangement on such a machine.

Self-propelled combines conventionally have a forward elevated operator's station to afford the operator adequate visibility during the operation of the machine. However, the engines in such combines have been arranged in a wide variety of locations on the combine, each of the locations having certain advantages and disadvantages. In most modern combines, the engines have been elevated, the operator's station, the engine, and at least a portion of the grain tank being mounted on the combine body generally above the separating mechanism. In many combines, the engine is located to the rear of the grain tank, isolating the operator from the engine heat and noise. Such an engine location, of course, complicates the engine controls, and, in some cases, increases the overall height of the machine. In many other modern combines, the engine is located toward the front of the combine, adjacent to the operator's station, the engine in some instances being immediately to the rear of the operator's station and in other instances being located laterally adjacent to the operator's station, the engine and operator's station being disposed on opposite sides of the combine. Such arrangements have, of course, reduced the complexity of the engine controls. However, the location of the engine adjacent to the operator subjects the operator to engine heat and noise.

Another problem associated with combine engines is the filtration of the engine-cooling air. Combines, of course, operate in an extremely dirty and trashy environment, and without filters for the engine-cooling air, the radiator would quickly become plugged and inoperative. Many different air filter arrangements have been utilized to clean the cooling air, some of which have utilized rotating self-cleaning screens, while others have utilized a system wherein the airflow is periodically reversed to clean the screens. Such mechanisms are obviously expensive and add to the durability and maintenance problems of the machine.

SUMMARY OF THE INVENTION

According to the present invention, a self-propelled combine is provided with a novel engine enclosure for its internal combustion engine. Also, an improved cooling air filtration system is provided in association with the engine enclosure.

An important feature of the invention resides in the use of a cooling air filtration system wherein the filters are self-cleaning but have no moving parts. More specifically, an engine enclosure is provided having a cooling air intake with filter elements and means for directing a portion of the air drawn through the intake along the outer surface of the filter elements to carry away foreign material collected thereon, bypassing the engine radiator. Still more specifically, the engine-cooling air is drawn through banks of louvers adjacent to air-filtering screens, the louvers deflecting a portion of the air so that it passes along the exterior surface of the screens.

Another important feature of the invention resides in the provision of an improved engine enclosure for an engine located adjacent to the operator's station. More specifically, an engine enclosure and engine-cooling system is provided wherein the airflow to the engine enclosure is directed away from the operator's station so that dust in the environment and heat from the engine are drawn away from the operator, the heated air being discharged at the side of the combine remote from the operator's station.

Another feature of the invention resides in an engine enclosure and cooling air system which decreases the noise level at the adjacent operator's station.

Still another feature resides in the provision of an attractive, highly stylized engine enclosure, which provides easy access to the engine for maintenance and repair thereof. Another feature of the engine enclosure resides in the provision of an engine enclosure having a fold-down panel at the front of the engine to provide a work platform or catwalk for working on the engine.

Still another feature of the invention resides in the arrangement of the engine in a transverse disposition with the engine enclosure adjacent to the operator's station, the output shaft extending toward the operator's station and under the operator's seat, the transverse arrangement of the output shaft eliminating the necessity for gear boxes and transmitting the power to the various conventional belt drives along the sides of the combine.

DESCRIPTION OF THE PREFERRED EMBODIMENTS

Figure 1:
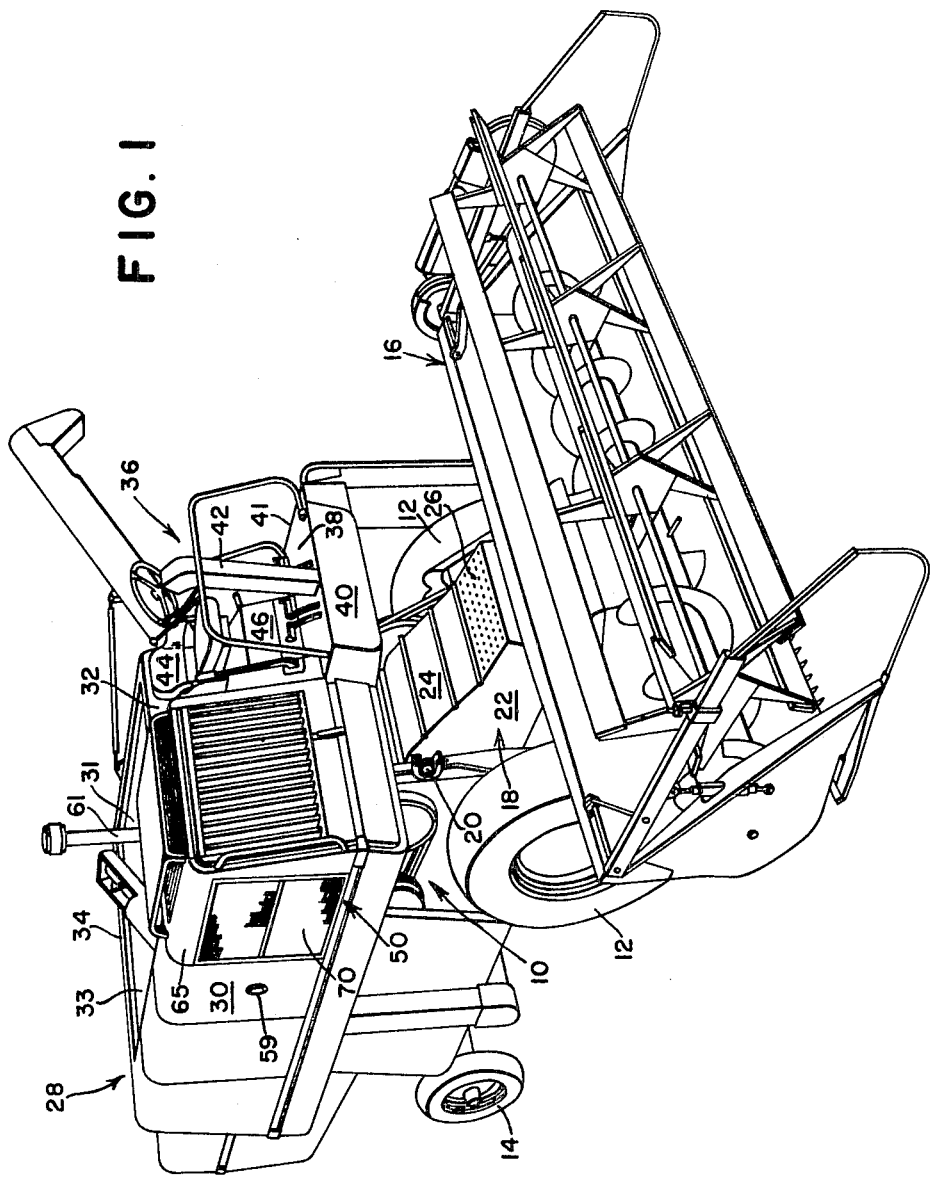
FIG. 1 is a right side, front perspective view of a self-propelled combine embodying the invention.

The invention is embodied in a self-propelled combine, which is shown in its entirety in FIG. 1. The combine includes a main separator body 10 mounted on a pair of forward drive wheels 12 and steerable rear wheels 14. The combine carries a forward, transversely elongated harvesting platform 16, which removes the crop from the field and delivers it rearwardly to the main separator body and is vertically adjustable relative thereto about a transverse pivot 20 at the forward end of the body, the vertical adjustment of the feeder housing 18 conventionally being accomplished by a pair of hydraulic cylinders (not shown) operative between the body and the feeder housing. The feeder housing 18 includes opposite upright sidewalls 22 and an upwardly and rearwardly inclined top wall 24, which is provided with a flat, generally horizontal platform or step 26 extending the width of the feeder housing.

The main separator body has substantially the same width as the feeder housing 18, the sides of the body 10 being substantially aligned with the sidewalls 22 of the feeder housing. Mounted on top of the body at approximately the center thereof, is an elevated grain tank, indicated in its entirety by the numeral 28. The grain tank 28 includes opposite sidewalls 30 and 31, upright front and rear walls 32 and 33 respectively, and a horizontal, open top 34. As is apparent, the sidewalls 30 and 31 are spaced outwardly from the sidewalls of the body 10, so that the grain tank 28 overhangs both sides of the body.

An elevated operator's station, indicated generally by the numeral 36, is mounted on the main separator body 10 immediately forward of the grain tank front wall 32, at the left forward corner of the combine body. It is to be understood that the terms "left" and "right," as well as such terms as "-fore-and-aft," "rear," etc., are with reference to a person facing in the direction of travel of the combine during its harvesting operation. The operator's station has a horizontal floor 38 having a forward end 40 forwardly of the main separator body and generally above the left drive wheel 12 and the feeder housing 18. The left side 41 of the floor is disposed slightly outwardly of the left side wall 31 of the grain tank, so that the operator's station projects from the body both to the left side and to the front. An upright steering column 42 extends upwardly from the forward end 40 of the floor and carries a steering wheel as well as other control levers. Directly behind the steering column 42 is a seat 44, which is mounted on a raisable hood structure 46 at the rear end of the floor 38. A generally fore-and-aft, upright control console 48, having various controls and gauges for the harvesting machinery and other combining components, is disposed at the right side of the operator's station.

Mounted on the right front corner of the body 10, laterally adjacent to the operator's station 36 and immediately forwardly of the grain tank 28, is an engine enclosure, indicated generally by the numeral 50. The engine enclosure includes a horizontal floor 51, slightly below the level of the operator's station floor 38, and an internal combustion engine 52 is mounted within the enclosure and supported above the floor 51. As is apparent in FIG. 5, the engine is transversely oriented, having a transverse output shaft, which extends laterally to the left under the control console 48 and the hood 46 on which the seat is mounted. The arrangement of the engine output shaft, and the various combine drive elements associated therewith, is shown in copending application Ser. No. 767,689, filed Oct. 15, 1968, and assigned to the assignee herein.

Figure 5:
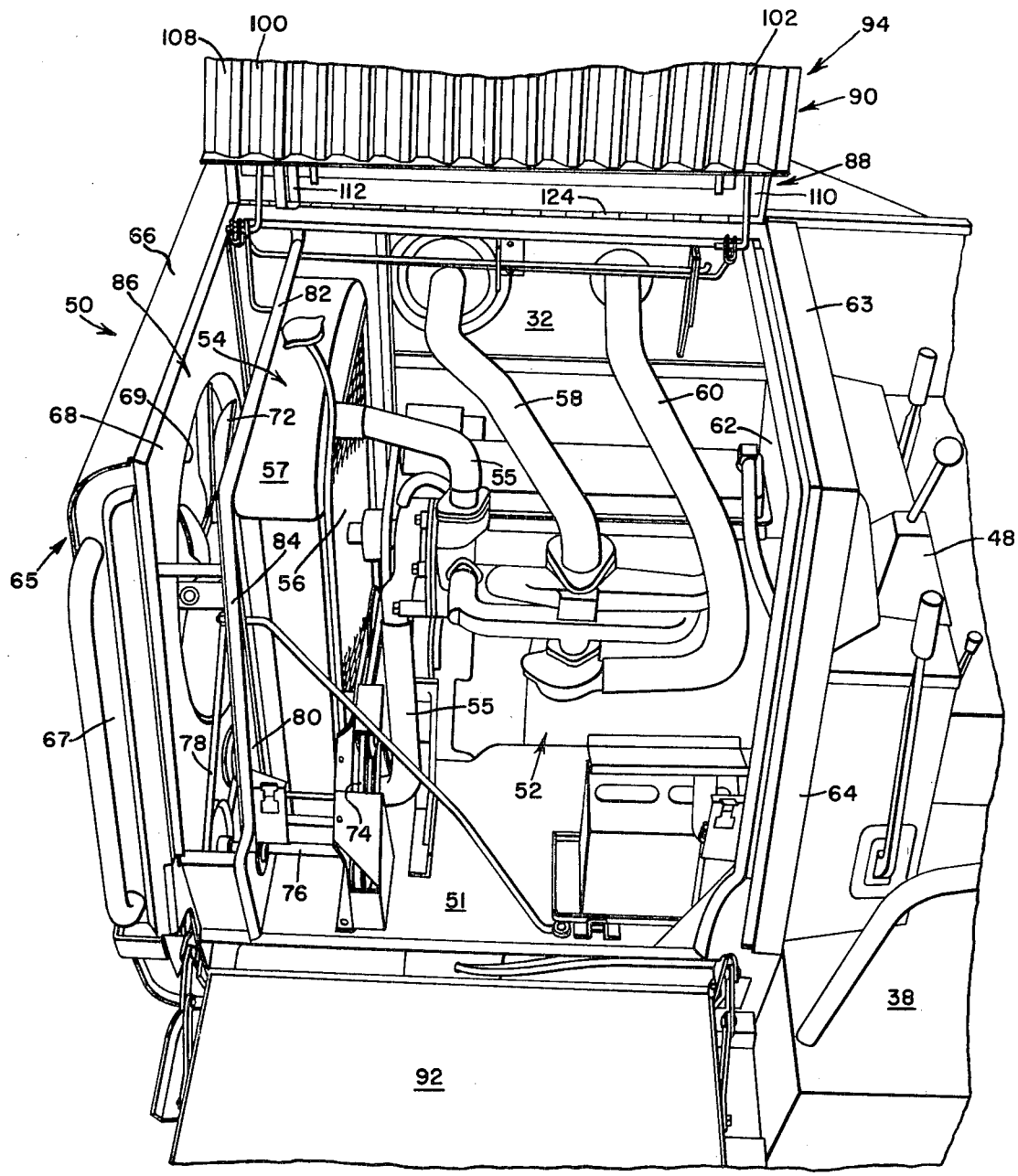
FIG. 5 is a top front perspective view of the engine enclosure with the top and front swung to open positions to expose the engine within the enclosure.

As shown in FIG. 5 the engine 52 has a heat exchanger or radiator 54 of conventional construction at the right-hand end of the engine, within the engine enclosure 50. The radiator 54 is mounted in an upright fore-and-aft position, and is connected to the engine by conventional radiator hoses 55, which circulate cooling water to and from the engine 52 through a conventional perforated radiator core 56. A coolant reservoir 57 is mounted on top of the radiator core 56, both the core and the reservoir substantially spanning the fore-and-aft length of the engine enclosure.

The engine 52 also includes an exhaust pipe 58 which extends through the front wall 32 of the grain tank and exist from the grain tank at an opening 59 in the right grain tank sidewall 30. Similarly, an air intake pipe 60 extends from the engine carburetor through the grain tank front wall 32 to an air cleaner 61 disposed within the grain tank. As is apparent, the front wall 32 functions as the rear wall of the engine enclosure 50.

The engine enclosure 50 has a generally upright inner or left sidewall 62 laterally adjacent to the control console 48. The inner sidewall 62 is provided with an opening through which the output end of the engine extends. The inner sidewall 62 extends forwardly from the front wall 32 of the grain tank and has a horizontal top edge 63 and a generally upright front edge 64, the front edge 64 being inclined slightly forwardly from top to bottom. As is apparent, the inner sidewall is disposed approximately on the fore-and-aft centerline of the combine. The engine enclosure has an outer or right sidewall 65 opposite the inner sidewall and in general fore-and-aft alignment with the right sidewall 30 of the grain tank. The outer sidewall 65 has substantially the same outer configuration as the inner sidewall, having a horizontal top edge 66 and a slightly inclined front edge 67 parallel to the edge 64. The outer sidewall has an inner panel 68, which is provided with a central circular discharge opening 69, and a grill or screen 70 substantially covering its entire outer surface.

A radially bladed fan 72 is journaled coaxially within the circular discharge opening 69, the fan having substantially the same diameter as the opening. The fan is driven in a clockwise direction as viewed from the right side of the combine and moves air from the engine enclosure interior laterally outwardly through the discharge or air outlet opening 69. Since the radiator 54 is interposed between the fan 72 and the engine 52, it is necessary that the fan drive from the engine circumvent the radiator, and to that end a first or inner belt drive 74 is provided to drive a transverse shaft 76 in front of the radiator, the shaft 76 in turn driving a second or outer belt drive 78, which is connected to the fan.

The radiator 54 is spaced from the inner panel 68 and is provided with an outwardly extending flange or panel 80 having a horizontal top edge 82 generally parallel to the top edges of the sidewalls, and a slightly inclined front edge 84, which is also substantially parallel to the front edges of the sidewalls. Since the radiator is spaced from the panel 68, a relatively narrow upright chamber 86 is formed therebetween.

Figure 3:
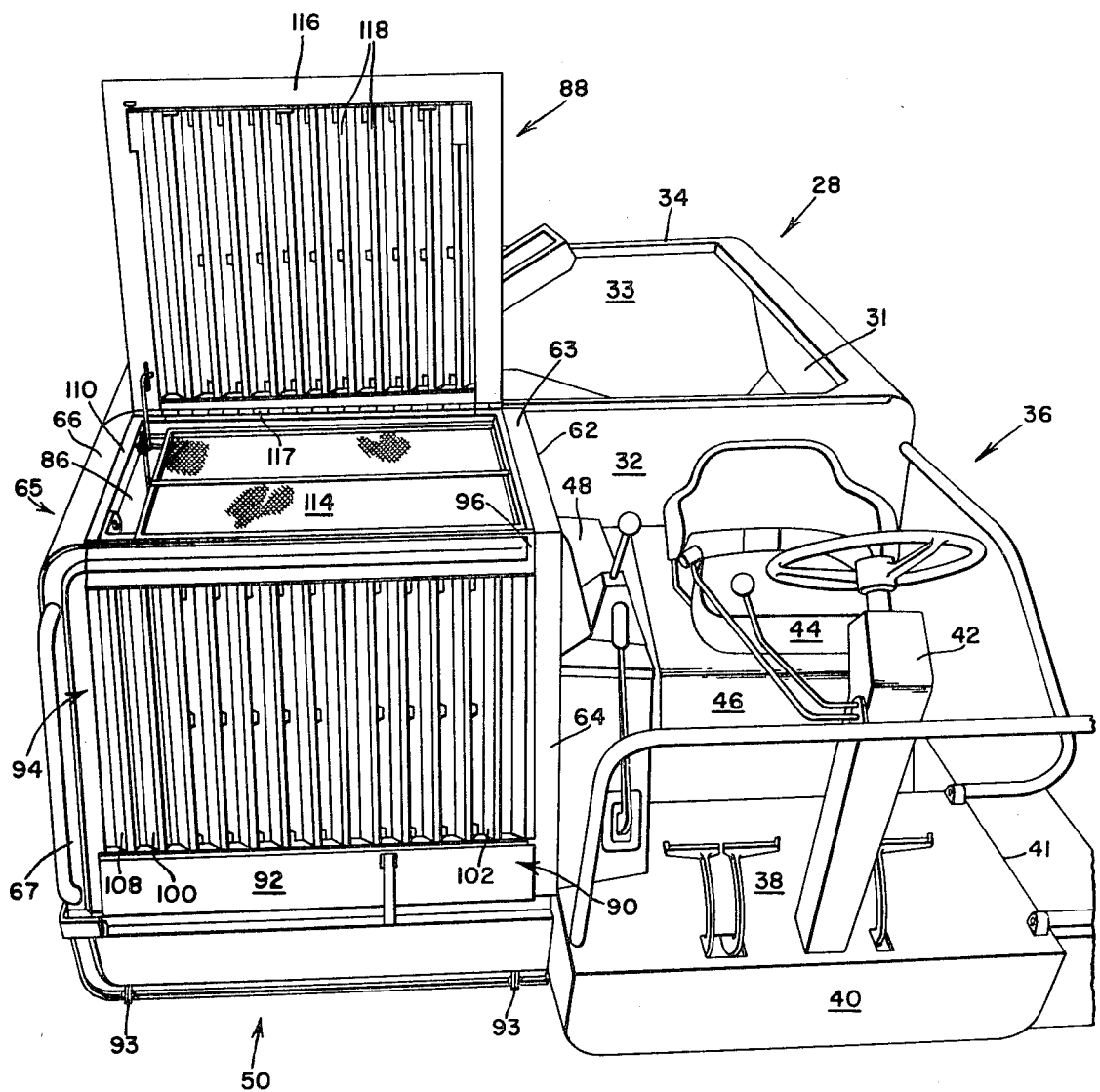
FIG. 3 is a top front perspective view of the upper portion of the combine, with a door in the top of the engine enclosure raised.
Figure 4:
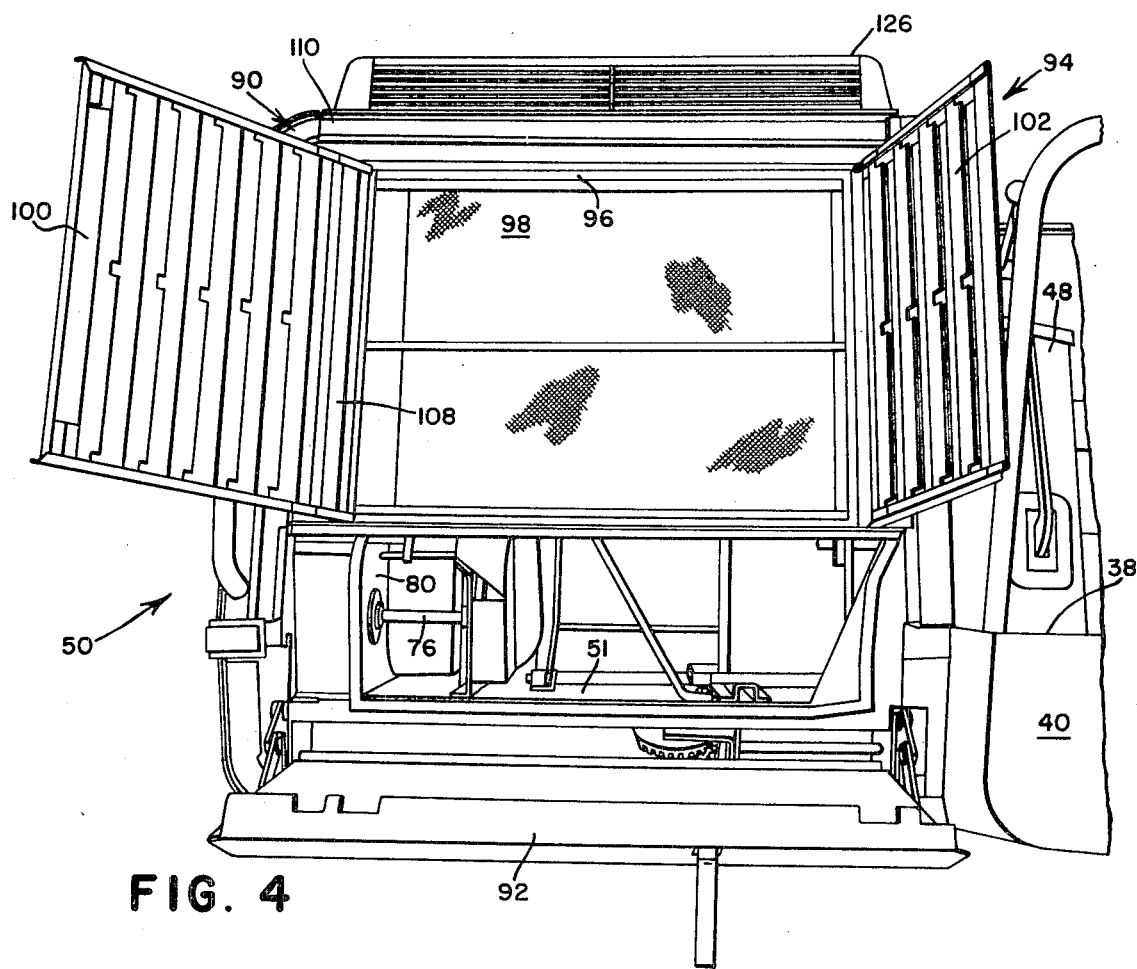
FIG. 4 is a front perspective view of the engine enclosure with the doors in the front wall in an open condition.

The boxlike engine enclosure 50 is completed by a generally horizontal top 88, which extends forwardly from the grain tank wall 32 between the opposite sidewalls 62 and 65, and a generally upright front wall 90, which extends between the forward end of the top 88 and the floor 51 between the opposite sidewalls. The front wall 90 includes a lower panel or door 92 which extends the width of the front wall and comprises approximately the lower one-third of the front wall. The lower panel 92 is mounted on a pair of hinges 93 at its bottom edge, and is swingable on said hinges from a generally upright closed position, as shown in FIG. 3, to a generally horizontal open position, as shown in FIG. 4. As is apparent, when the lower panel is swung to its open position, it extends forwardly from the engine enclosure at approximately the same level as the engine enclosure floor 51, providing a convenient work platform or catwalk for working on the engine.

The remaining part of the front wall 90 is formed by a louvered upper portion 94, which includes a rectangular frame 96, the opposite sides of which seat on recesses along the front edges 64 and 67 of the sidewalls. The frame 96 also has a vertical frame member 97 adjacent to and parallel to the right end of the frame, the frame member 97 seating against the upper portion of the front edge 84 on the radiator flange, the edge 84 preferably being provided with a sealing material on its outer surface. The frame 96 has a rectangular, interior opening, which extends laterally from the frame member 97 to the opposite or inner end of the frame adjacent the inner sidewall. A rectangular screen or filter, having a relatively fine mesh, is removably mounted in the frame over said opening to filter the air drawn through the opening and through the radiator core by the fan, the screen mesh being sufficiently fine to filter out any foreign material in the air that would tend to plug the radiator core.

Mounted in the frame 96 opposite the screen 98 and spaced a relatively short distance therefrom, are a pair of louvered doors 100 and 102, the right-hand louvered door 100 being mounted for swinging about a vertical axis at its right-hand end adjacent the frame member 97 and the left-hand door being mounted for swinging about a vertical axis at its left-hand end adjacent the inner sidewall 62. As is apparent from FIG. 3, the doors 100 and 102 cover the exterior side of the screen when they are in their closed position, and are swingable to an open position, as shown in FIG. 4, wherein the screen is completely exposed for easy removal. Each door is formed by a number of vertically extending overlapping louvers or vanes 104, the louvers being inclined rearwardly and to the right forming vertically extending openings 106 between adjacent louvers. Thus, air enters the engine enclosure through the openings 106 and at least a portion of the air is deflected toward the right along the outer surface of the screen. A closed, louver like end panel 108 is provided at the right end of the right door 100 opposite the chamber 86, so that the louver openings 106 are only arranged opposite the screen 98.

Figure 2:
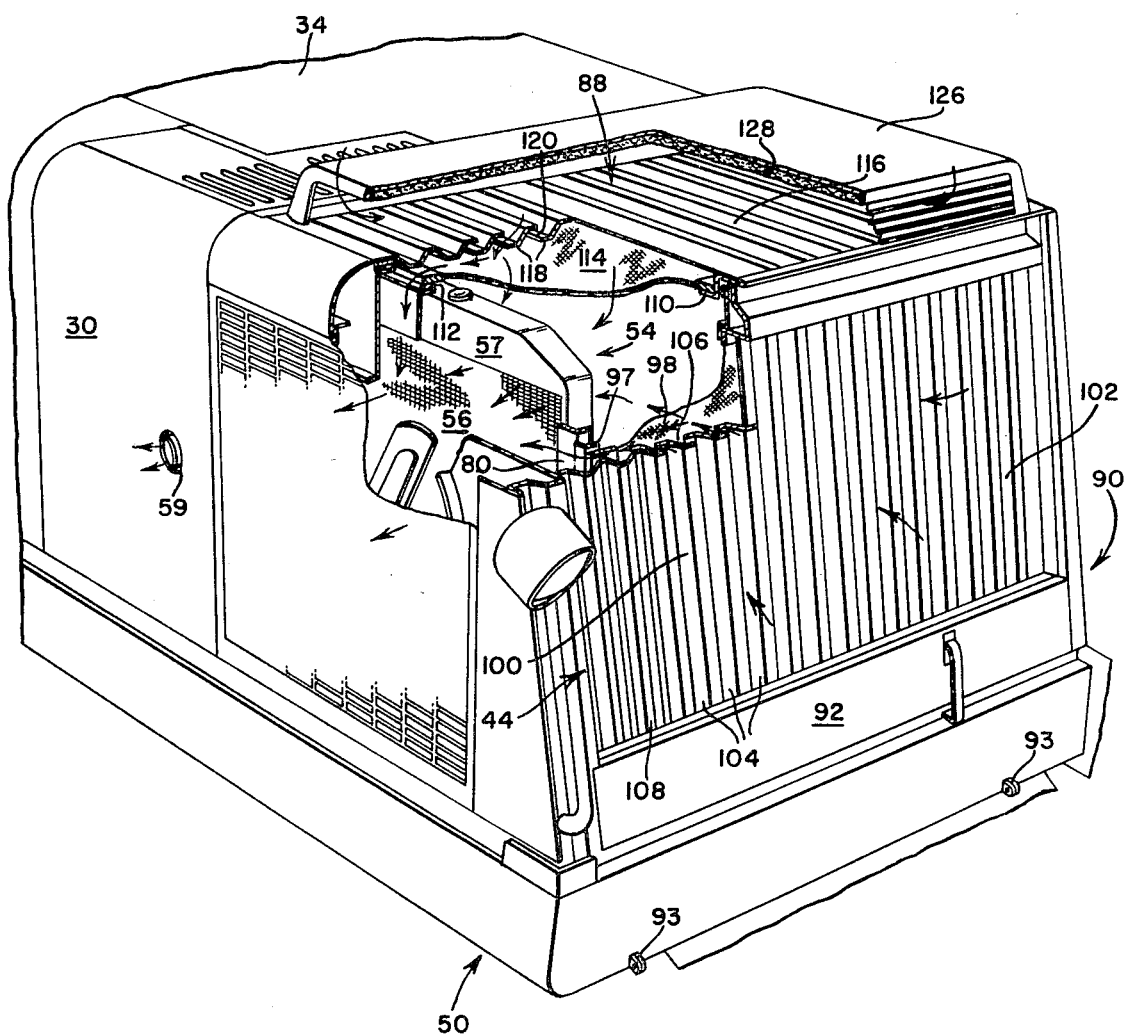
FIG. 2 is an enlarged perspective view similar to FIG. 1, showing only the engine enclosure area of the combine, with portions of the enclosure broken away to more clearly illustrate the invention.

The engine enclosure top 88, like the front wall 90, has a rectangular, open, top frame 110, which forms the periphery of the enclosure top, the opposite lateral ends of the frame seating on recesses in the top edges 63 and 66 of the sidewalls. A fore-and-aft frame member 112 adjacent the right end of the frame seats on the top edge 82 of the radiator flange, the edge 82 again being provided with a gasketlike material to seal the chamber 86 from the rest of the engine enclosure except for the passages through the radiator core. A rectangular top screen or filter 114 is removably mounted on the frame over the central opening, the top screen being similar to and having the same mesh as the front screen 98. A louvered top door 116 substantially covers the entire top frame 110 and is mounted thereon by means of a transverse hinge 117 at the rear end of the door 116. The top door 116 is swingable from its normally closed position, as shown in FIGS. 1 and 2, to an upright vertical position, as shown in FIG. 3, providing access to the top screen 114 for easy removal or cleaning thereof. The area of the top door 116 opposite the screen is formed by a number of fore-and-aft, overlapping vanes or louvers 118 having the same configuration as the louvers in the front wall and forming fore-and-aft extending openings 120 between the adjacent louvers, the openings 106 and 120 forming the air inlet means for the engine enclosure. Like the louvers in the front wall, the top louvers operate to deflect at least a portion of the air moving through the openings 120 laterally to the right along the surface of the top screen 114.

The entire top 88 is swingable about a transverse hinge 124 between the rear end of the top frame 110 and the wall 32, and the entire upper portion 94 of the front wall 90 swingably depends from the front edge of the top 88, so that the entire enclosure top and the upper portion of the front wall are swingable upwardly and rearwardly to a vertical position wherein they expose the top and front of the engine enclosure, as shown in FIG. 5.

A flat, horizontal sound deflector or baffle 126 is mounted in the top door 116, the sound baffle being spaced above the upper surface of the door 116 and having an acoustical liner 128 on its lower side opposite the openings 120 in the top. The sound deflector or baffle reduces the exposure of the operator to both the heat and the noise emanating from the top of the engine enclosure.

As is apparent from the drawings, the engine enclosure blends with the remainder of the combine to provide an attractive overall combine apparatus. As is also apparent, the engine enclosure permits easy access to the engine therein for engine maintenance. Also, since the airflow through the engine enclosure moves from the openings in the top and the front of the enclosure and laterally outwardly out the side of the enclosure away from the operator's station, the heat and noise from the engine are directed away from the operator.

Figure 6:
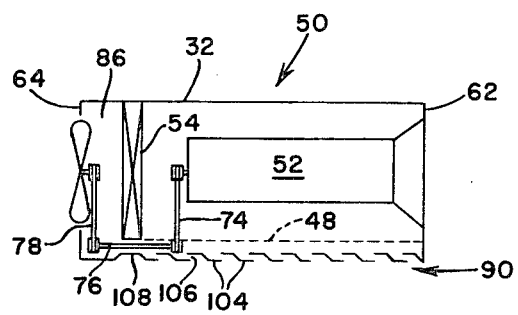
FIG. 6 is a top schematic view of the engine and engine enclosure.
Figure 7:
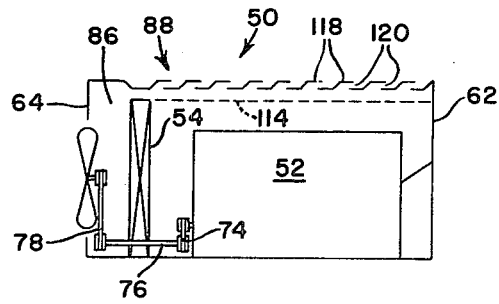
FIG. 7 is a front schematic view of the engine enclosure shown in FIG. 6.

The filtration system for the cooling airflow through the engine enclosure can best be appreciated from FIG. 2 and the schematic illustrations in FIGS. 6 and 7. As shown by the arrows in said FIGURES, the air and foreign material carried by the air enter through the openings 106 between the louvers 104 in the front wall 90 and through the openings 120 between the louvers 118 in the top 88. The air and foreign material entering the openings in the top and front wall are deflected laterally toward the right side of the combine by the louvers, which function as deflector vanes. However, most of the air is pulled through the top screen 114 or the front screen 98, and after passing around the engine, such air is drawn through the radiator core 56 and discharged out the side of the combine by the fan 72. However, the foreign material has a greater mass than the air and consequently a greater inertia, and since it is deflected laterally, its momentum carries it laterally along the exterial sides of the screens until it reaches the chamber 86 at the right end of the enclosure, a relatively small portion of the air also moving along the exterior sides of the screens with the foreign material. The air moving along the exterior sides of the screens tends to pick up any foreign material accumulating on the screens, so that the screens are self-cleaning. The air and foreign material moving along the top of the top screen 114 move over the top of the radiator into the chamber 86, from which it is discharged through the opening 69 by the fan 72 along with the air moving through the radiator core, while the air and foreign material moving laterally along the exterior of the front screen 98 move around the front of the radiator into the chamber 86 from which it is similarly discharged. The proportion of the air filtered through the screens and the proportion of the air bypassing the radiator and cleaning the screens depends somewhat on the angle and configuration of the louvers. In the illustrated embodiment, approximately 85 percent of the total air drawn into the engine enclosure moves through the screen, while approximately 15 percent of the air cleans the screens and bypasses the radiator.

As is apparent, the doors in the top and front wall also provide easy access to the screens, in the event that they need additional cleaning. However, if the screens do become partially clogged due to an unusually contaminated environment, the percentage of air drawn through the screens will automatically decrease, to increase the amount of cleaning air.

Figure 8:
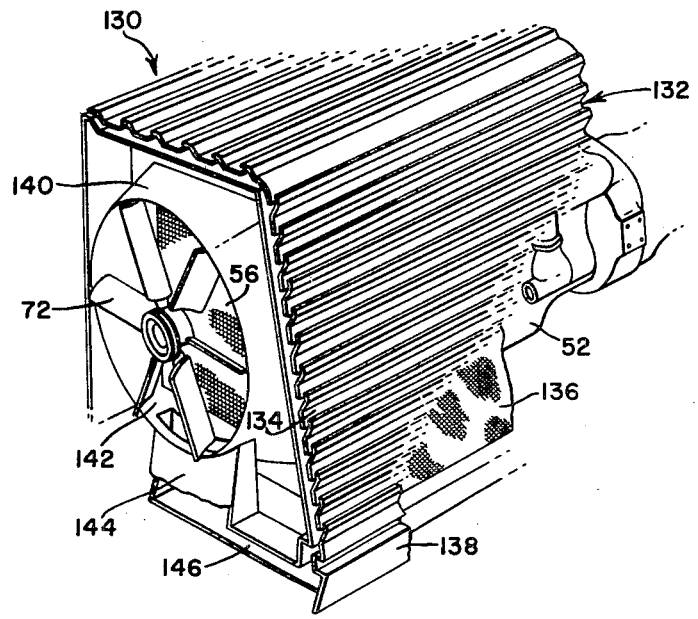
FIG. 8 is a perspective view of a second embodiment of the engine enclosure, with portions of the engine enclosure removed to more clearly illustrate the invention.

A slightly different embodiment of the engine enclosure is partially shown in FIG. 8, although the alternate arrangement shown in FIG. 8 utilizes the same basic principle for filtering the cooling air. The engine enclosure again includes a generally horizontal top 130 and a generally upright front wall 132. The top and front wall are provided with laterally extending louvers 134, the louvers again overlapping and having air inlet openings between the adjacent louvers. Interiorly of the louvered top and front wall are filter elements or screens 136. The screens are spaced from the louvers as in the previous embodiment, and a transversely extending duct 138 communicates with the space between the front wall louvers and screen at the bottom of the front wall. The fan 72 in the outer sidewall is mounted in a fan shroud 140 having a generally cylindrical opening 142, the fan blades moving closely adjacent to the wall of the opening 142. The bottom wall of the cylindrical opening 142 communicates with a vertical passage or duct 144, which in turn is connected to the transverse duct 138 by a horizontal passage 146.

The air moving through the openings between the louvers in the top 130 is deflected forwardly, a portion of the air moving forwardly along the top surface of the screen, with the remainder of the air being drawn through the screen, and through the radiator core for discharge out the side of the engine enclosure. Similarly, the air moving through the openings in the front wall 132 is deflected downwardly, with most of the air being drawn through the front screen 136, while a portion of the air is deflected downwardly across the front surface of the screen. The air moving forwardly along the top of the top screen is deflected around the upper forward corner of the engine enclosure and also moves downwardly across the forward side of the forward screen through the duct 138. The fan moving past the vertical passage 144 in the lower wall of the opening 142 creates a suction in the vertical passage 144, so that the air and foreign material in the collector duct 138 is drawn through the passage 146 and the passage 144 and discharged out the side of the combine with the cooling air moving through the radiator core 56.

Figure 9:
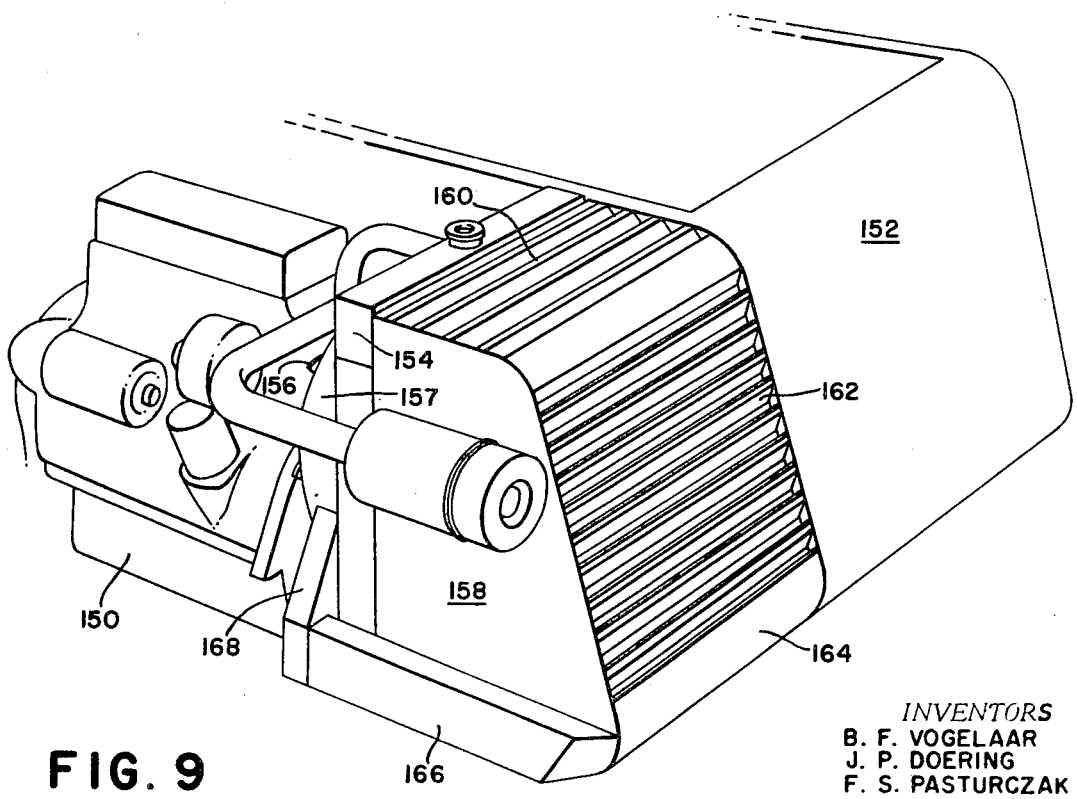
FIG. 9 is a perspective view of a third embodiment of the invention, utilizing the air filtration system for the radiator of an exposed engine.

While the above-described air filtration system is advantageously incorporated in the engine enclosure for a front-mounted combine engine, the same principle could be utilized in air filtration system for other engine locations, such as shown in FIG. 9, wherein a combine engine 150 is transversely oriented behind an elevated grain tank 152, which is a common arrangement for combine engines. The engine 150 has an upright radiator 154 adjacent the side of the combine and a conventional fan 156 is mounted in a fan shroud 157 between the engine and the radiator and is operative to draw air through the radiator 154 toward the engine. The air-cleaning system is located on the outer or intake side of the radiator and includes a vertical rear wall 158 extending laterally from the rear end of the radiator, a horizontal top wall 160 extending laterally from the top of the radiator between the grain tank and the rear wall 158, and a generally upright sidewall 162, which is aligned with the outside wall of the grain tank and extends between the grain tank and the rear wall 158. The top and sidewalls 160 and 162 are again louvered, and have filter screens (not shown) spaced inwardly from the openings between the louvers. Most of the air drawn through the louver openings passes through the screens and through the radiator 154, and is discharged toward the engine by the fan 156. However, a portion of the air drawn through the top 160 is deflected laterally along the top of the associated screen and is then deflected downwardly along the outer surface of the side screen. Similarly, a portion of the air moving through the side louver openings is deflected downwardly along the exterior side of the side screen, and the air moving along the exterior sides of the screens is again collected in a duct 164 at the bottom edge of the sidewall 162. The collector duct 164 communicates with a transverse transfer duct 166, which in turn is connected to the sidewall of the fan shroud 157 by a passage or duct 168, so that the air and foreign material carried off the exterior sides of the screen is drawn through the ducts and discharged by the fan toward the engine.

We claim:

1. In a self-propelled agricultural machine having a main body, an elevated, transversely oriented engine with a forwardly facing side and an elevated operator's station mounted laterally adjacent to one another at the front of the body, a forward transversely elongated harvesting header, and a crop-feeding means between the header and the body for conveying the crop from the header to the body and including a housing with a forwardly and downwardly inclined upper surface forwardly of and below the engine, the improvement comprising: an engine enclosure means mounted on the body and substantially enclosing the engine, and including a generally upright front wall and a first door means in the front wall swingably mounted on generally vertical pivot means on the front wall for swinging between a closed position and an open position wherein the first door means extends forwardly from the engine enclosure to provide access to the enclosure interior and to the side of the engine.

2. The invention defined in claim 1 wherein the first door means includes a pair of doors respectively mounted on vertical pivot means disposed adjacent to the opposite lateral ends of the front wall so that the doors respectively extend forwardly from the opposite lateral ends of the front wall in their open position.

3. The invention defined in claim 1 wherein the front wall includes a second door means having a relatively flat inner surface and mounted on a transverse hinge means adjacent its lower edge for swinging between a closed generally upright position and an open position wherein it extends forwardly from the enclosure means with the flat inner surface in a generally horizontal position to provide an elevated work platform adjacent to and forwardly of the engine.

4. The invention defined in claim 3 and including a generally horizontal step means disposed on the upper surface of the crop-feeding means housing forwardly of and below the level of the second door means when the second door means is in its open position, the generally horizontal upper surface of the step means being canted relative to the inclined upper surface of the housing.

5. The invention defined in claim 1 wherein the engine enclosure includes a generally horizontal top, and top door means in the enclosure top swingable about a horizontal axis between a closed horizontal position and an open position wherein it provides access to the enclosure interior.

6. The invention defined in claim 1 wherein the engine enclosure includes a generally horizontal top swingably connected to the enclosure on a transverse pivot adjacent its rearward end for swinging upwardly and rearwardly from a horozintal closed position to an open position, and at least a portion of the front wall is connected to the top for movement therewith to expose the engine and enclosure from both the front and the top when the top is moved to its open position.

7. The invention defined in claim 6 wherein the first door means is disposed in the portion of the front wall connected to the top wall.

8. In a self-propelled agricultural machine having a main body, an elevated engine and an elevated operator's station including a floor mounted laterally adjacent to one another at the front of the body, a forward transversely elongated harvesting header, and a crop-feeding means between the header and the body for conveying the crop from the header to the body and including a housing with a forwardly and downwardly inclined upper surface forwardly of and below the engine, the improvement comprising: an engine enclosure means mounted on the body and substantially enclosing the engine, and including a generally upright front wall having a lower door means with a relatively flat inner surface and mounted on a transverse hinge means adjacent its lower edge for swinging between a closed generally upright position and an open position wherein it extends forwardly from the enclosure means with the flat inner surface in a generally horizontal position accessibly adjacent from and parallel to the floor to provide an elevated work platform adjacent to and forwardly to the engine and accessible from the operator's station.

9. The invention defined in claim 8 and including a generally horizontal step means disposed on the upper surface of the crop-feeding means housing forwardly of and below the level of the lower door means when the lower door means is in its open position, the generally horizontal upper surface of the step means being canted relatively to the inclined surface of the housing.

10 The invention defined in claim 8 wherein the enclosure includes a top and the front wall includes an upper portion swingably mounted at its upper edge on transverse pivot means at the forward end of the top.

11. The invention defined in claim 10 wherein the top is swingably connected to the enclosure on a transverse pivot adjacent its rearward end for swinging upwardly and rearwardly from a horizontal closed position to an open position, the upper portion of the front wall swinging upwardly and rearwardly with the top and collapsing about its pivot connection toward the top to expose the engine from both the front and top.

12. The invention defined in claim 10 wherein the top includes a top door means swingable about a horizontal axis between a closed horizontal position and an open position wherein it provides access to the enclosure interior.

13. A self-propelled combine comprising: a mobile main separator body; a forward, transversely elongated harvesting header carried by the main body, an elevated grain tank mounted on a central portion of the body and having first and second upright opposite lateral sidewalls overhanging the opposite side of the body and an open generally horizontal top; an elevated engine enclosure mounted on one side of the forward end of the body adjacent to and forwardly of the grain tank and including an outer, generally upright sidewall generally flush with the first sidewall of the grain tank and having an air outlet opening, a horizontal top wall at substantially the same level as the top of the grain tank, an approximately upright front wall, at least one of said top and front walls being provided with an air inlet means, an axially transverse engine mounted within the enclosure and having an associated radiator; fan means within the engine enclosure for drawing air through the air inlet opening, moving it through the radiator and discharging it through the air outlet opening; and an elevated operator's station mounted on the other side of the forward end of the body, forwardly of and adjacent to the grain tank and laterally of and adjacent to the engine enclosure.

14. The invention defined in claim 13 wherein the air inlet means includes a first inlet opening in the enclosure top wall and a second inlet opening in the enclosure front wall.

* * * * *